United States Patent [19]

Chrosziel

[11] Patent Number: 4,752,798
[45] Date of Patent: Jun. 21, 1988

[54] SWINGABLE HOLDER FOR ANTERIOR ACCESSORIES OF AN OBJECTIVE LENS

[75] Inventor: Alfred Chrosziel, Munich, Fed. Rep. of Germany

[73] Assignee: Filmtechnik Alfred Chrosziel GmbH, Munich, Fed. Rep. of Germany

[21] Appl. No.: 73,735

[22] Filed: Jul. 15, 1987

[30] Foreign Application Priority Data

Jul. 15, 1986 [DE] Fed. Rep. of Germany ... 8618985[U]

[51] Int. Cl.⁴ ............................................. G03B 11/04
[52] U.S. Cl. ...................................... 354/287; 350/581
[58] Field of Search ................ 354/287, 295; 350/580, 350/581

[56] References Cited

U.S. PATENT DOCUMENTS 1,991,814  2/1935  Mitchell ............................. 350/581

*Primary Examiner*—Michael L. Gellner
*Attorney, Agent, or Firm*—Frishauf, Holtz, Goodman & Woodward

[57] ABSTRACT

A mounting for a sun shade, a filter or both for the usual bulky lens of a professional video camera can be moved forward or backward parallel to the lens axis on two parallel guide rails (3, 4), the rear ends of which are fixed on a frame (18) supported forward of the lens mounting support (9) by rods (25, 26) and a structure (9) which supports the lens. On the guide rails extending foward from the frame (18) there is mounted a back-and-forth shiftable articulation device (10, 13, 14) which permits swinging of its outer member (14), only in the forward position of the device, about the articulation joint (13). Movement of the accessory towards and away from the lens is driven by an eccentric arm (19) which is linked to a swinging member (22) for transmitting linear motion. A manipulation member 21 serves to move the eccentric arm 19. When the articulation device is in its forward position, the free ends (7, 8) of the guide rails (3, 4) come out of the holes (15, 16) in the front member (14) of the shiftable articulation device and thus release the locking of the articulation joint (13), so that the sun shade, etc., and its bellows (27) can be swung out of the field of view of the lens.

7 Claims, 4 Drawing Sheets

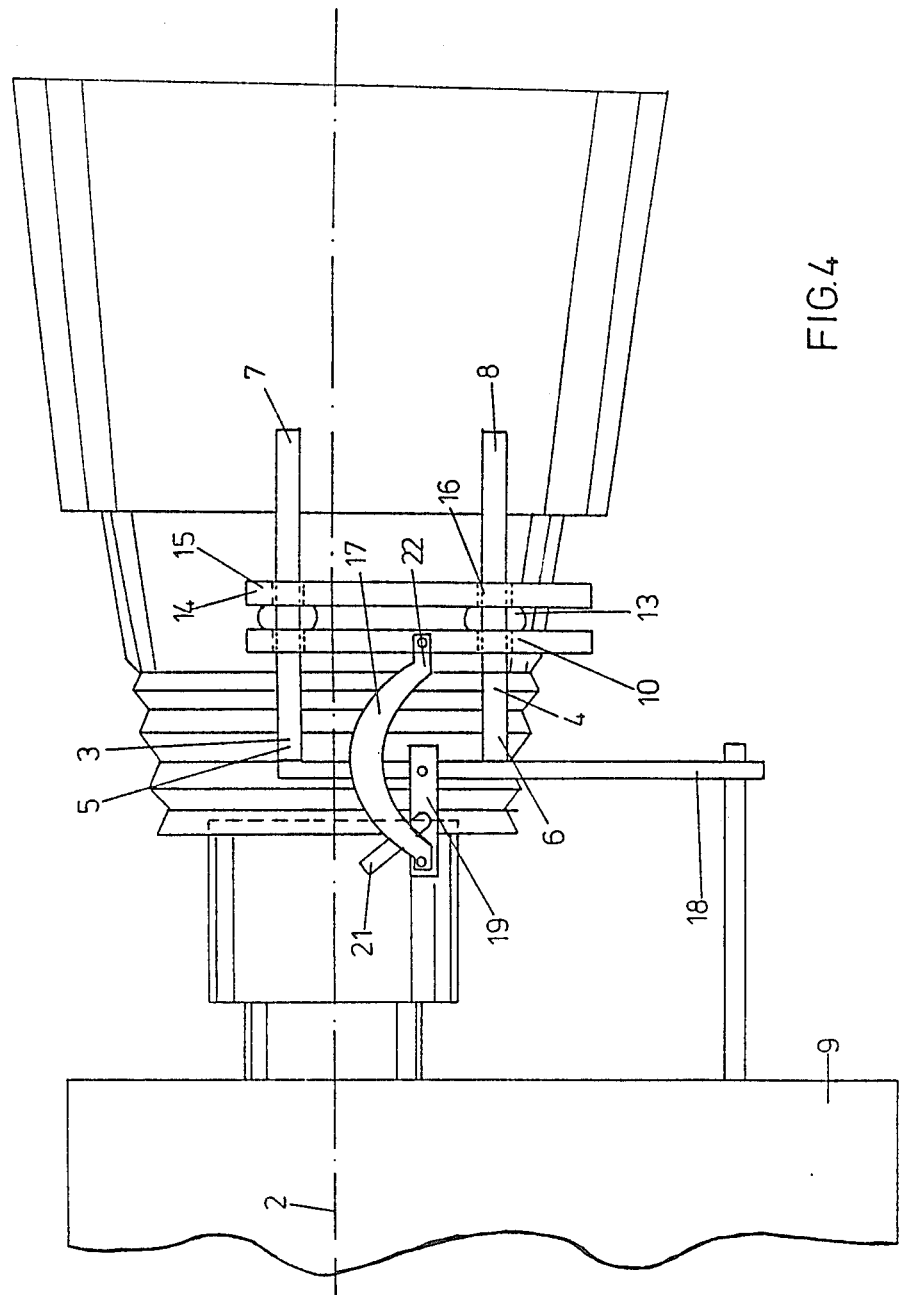

SWINGABLE HOLDER FOR ANTERIOR ACCESSORIES OF AN OBJECTIVE LENS

This invention concerns a holder for front-of-lens accessories for the objective lens of an optical system such as a photographic or television camera such that an accessory can be swung away from the optical path in use and swung back so that it fits over the front end of the objective lens. Such holders are particularly important for large objective lenses such as are used in professional motion picture and television cameras. In such cases, the objective lens mounting of the camera itself is integrated with the camera mount or holder, so that it is, as a rule, movably mounted on a stable stationary structure.

Such objective lenses in many cases have a relatively large diameter. The same holds also for the accessories to be mounted in front of it (hereinafter referred to as anterior accessories) such as sunshades, which are sometimes called "mattboxes", filter holders or combinations of sunshade and filter holders. These anterior accessories must fit closely over the lens in order to exclude stray light to a great extent, as a result of which the connection usually involves the provision of a flexible bellows. The anterior accessory must have a sufficiently large opening in order not to cut off any part of the field of wide angle objectives. In general, for certain sizes of wide angle objectives, only particular anterior accessories designed for such wide angle service can be used. The anterior accessories are so bulky and heavy that removing them by unscrewing or the like, as is done in the case bf cameras for amateur use, no longer makes sense. For these reasons, such anterior accessories are connected with the objective lens support by a displacement mechanism in order to shift the entire anterior accessory forward, thereby also making possible removal of the bellows which surrounds the objective lens at its free front end to keep out stray light when the accessory is in working position. Furthermore, in addition to the displacement mechanism, the holder for anterior accessories of the kind above discussed also has a mechanism for swinging the accessories out of the optical path. This has form of a two-part articulation which makes it possible, after the forward displacement of the accessory holder, to swing the entire anterior accessory to one side, or up, or down, away from the objective lens.

In the known holders above described for anterior accessories suitable for large lenses, the mount for the anterior accessories must first be brought forward with effort and some difficulty, then a positioning catch for the swing mechanism must be released and finally, the anterior accessory must be swung outside of the picture angle of the lens in order to carry out various necessary operations, such as removal of the lens for checking it and possibly cleaning of the film plate, or replacing the lens with another objective lens. After any of these operations for checking or replacing the lens, all of the described stages must be carried out in reverse sequence to put the anterior accessory back in working position.

Displacing the anterior accessory holder away from the lens requires much effort and the releasing of the positioning catch or lock is troublesome, all of which, in situations requiring a quick change of lens, can have the result that certain scenes cannot be correctly recorded on tape or film or correctly given live television reproduction.

SUMMARY OF THE INVENTION

It is an object of the present invention to provide a mounting for anterior accessories for objective lenses in such a form that the release of the swinging mechanism is simplified.

Briefly, a guide rail, and preferably two of them, are disposed parallel to the axis of the lens having one end fixed in place on the lens support, which may be the camera body or similar structure. The guide rail has free ends at which an articulation structure is provided having an inner member mounted shiftably on the guide rails and an outer member articulated to the inner member by a swing joint and connectable also to an anterior accessory for the lens, the inner and outer members being, in working position, essentially parallel to each other and at right angles to the guide rails. The easy release of positioning for permitting swinging is made possible by providing apertures in the outer member directed towards the guide rails for locking the articulation of outer member in working position.

An important concept involved in the invention is to couple the positioning of the swinging mechanism with the linear displacement mechanism of the anterior accessory holder in such a way that the positioning is automatically released when the forward displacement of the anterior accessory is complete and that after the swinging of the anterior accessory onto the lens axis and pushing it back towards the lens, the positioning lock snaps in place automatically. This is provided in such a way that, in the swingable outer member of the articulation, positioning holes are provided which are directed to and face guide rail ends when the accessory holder is in its forward position. When the anterior accessory is pushed onto the lens, the guide rails catch in these positioning holes and when the anterior accessory is shifted fully forwards, the free ends of the guide rails come out of the positioning apertures so that the swinging mechanism is automatically set free.

In a preferred embodiment, a drive is provided between the attachment frame for the fixed ends of the guide rails and the inner member of the articulation which can displace the anterior accessory forward and back over a predetermined distance. The most varied kinds of means can be used for such a drive, for example, an electric motor, a rack rod engaging a rotatable gear or a spring mechanism.

The drive preferably consists of an eccentric device, of the over-center lever type. An eccentric arm has a forward position in which its length is additive to that of a swinging lever actuated by it and a rearward position where its length is subtracted from that of the swinging lever, in determining the distance of the articulation from the mounting frame for the fixed ends of the guide rails. A manipulation lever is linked or fastened to the eccentric lever to supply torque to the eccentric movement. The length of the guide rails, the size relations and the dimensional ratios of eccentric arm and swinging lever can be so determined that by rotation of the eccentric arm in a first direction by 180° a defined positioning of the anterior accessory at or against the lens can be obtained and by rotation about 180° in the opposite direction a shifting away of the anterior accessory from the lens by a defined distance results as well as a simultaneous clearing of the positioning openings. It is particularly useful for the middle section of the swinging member to be arcuately shaped to facilitate handling and also the development of the necessary torque for the actuation of the eccentric drive.

With such a drive, an anterior accessory at a working position at or against the front of the objective lens can be shifted forward with a single lever movement by a precisely defined amount and with a small use of force up to a final stop position and the rotary mechanism will thus be immediately freed and the anterior accessory can then be swung out of the field of view of the lens for a lens change or other necessary operation. When that operation is completed, the anterior accessory can be swung back to the optic axis of the lens after which a single lever movement of 180° in the opposite direction can lock the accessory in position and perform the exact return of the bellows of the accessory onto the lens. Furthermore, on account of the frictional conditions present intermediate positioning of the eccentric arm by its manipulating lever is possible to a certain degree. That can produce a somewhat modified spacing of the anterior objective from the lens for the same lens focal length, or adapt an anterior accessory for a somewhat larger range of lens focal lengths. Changing the spacing modifies the angle of incidence conditions at the accessory.

Another possible use of the intermediate positioning of the advance and retraction lever is to accommodate to a certain extent the use of lenses of different physical (barrel) length. In this case, an intermediate positioning of the displacement lever can provide a precise placing of the bellows on the end of the lens for different lens barrel lengths.

The accessory mounting of the present invention makes single-handed manipulation possible with minimum amount of applied force, whereas heretofore displacement required effort with the use of both hands and a danger of putting the overall camera support out of adjustment.

BRIEF DESCRIPTION OF THE DRAWINGS

The invention is further described by way of illustrative example with reference to the annexed drawings, in which

FIG. 4 is a side view corresponding to the top view in FIG. 2.

DESCRIPTION OF THE ILLUSTRATED EMBODIMENT

Figure 1:
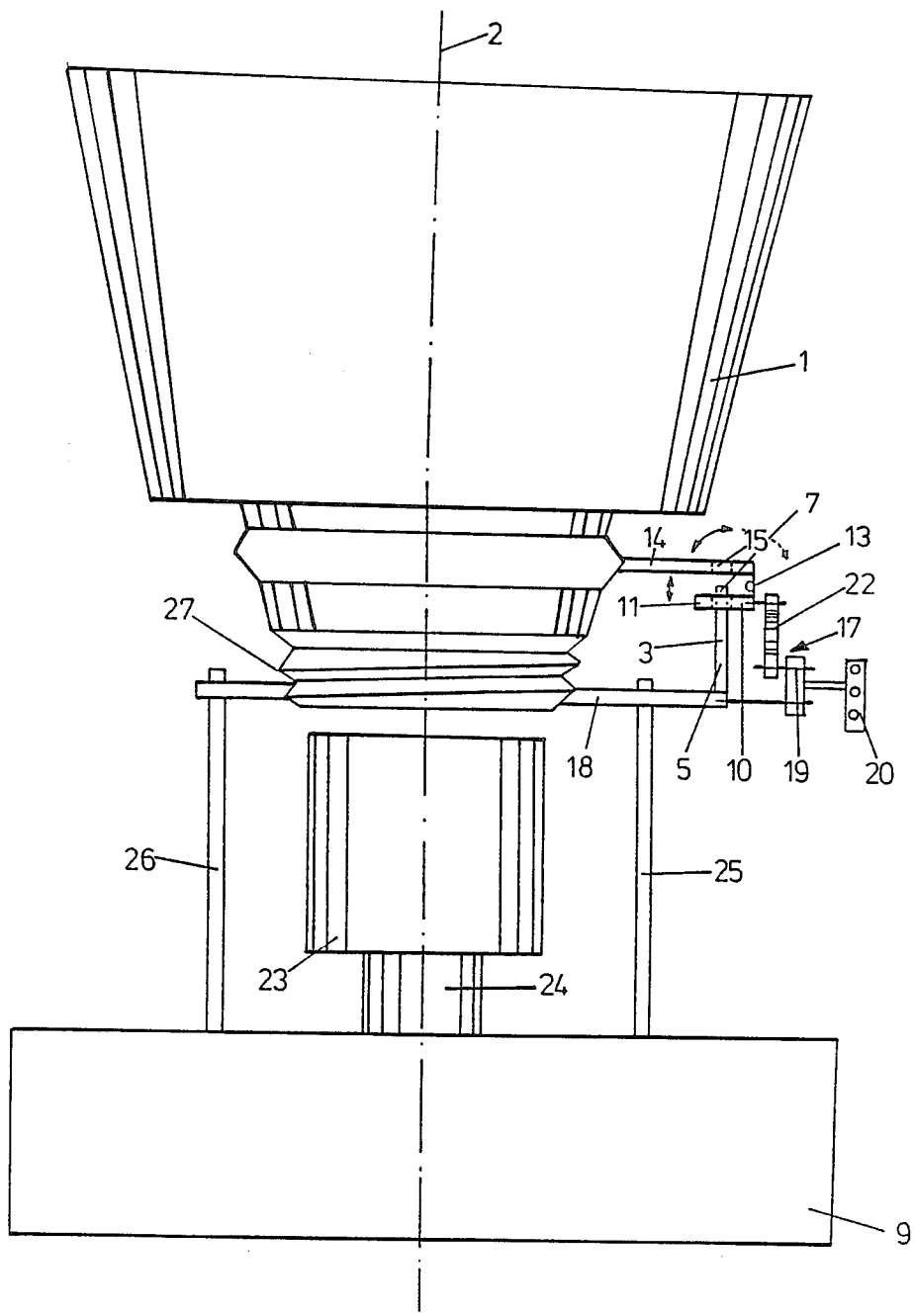
FIG. 1 is a top view of a laterally disposed anterior accessory holder with the anterior accessory shifted into its forward (non-working) position.

In the several figures of the drawings, the same parts are designated with the same reference numerals.

FIG. 1 shows the accessory 1 in a location centered on the optic axis 2 of the lens 23. The lens 23 is mounted on the objective lens support 9 by means of an intermediate member 24. For reasons of simplification of the drawings, the remaining components are not shown, especially those in the light transmission path from the lens 23 to the camera (not shown) located behind the end support 9 which may be a front surface of the camera. The stationary structure to which the end support 9 and the rest of the camera are fixed is likewise not shown.

Beneath the lens 23 two rods 25 and 26, parallel to the optic axis of the lens are provided on which a sliding frame 18 can be shifted in forward and back adjustment to serve, in fixed position, as a mounting frame. At one side of the frame 18, a guide rail 3 is provided which is again parallel to the optic axis 2 and has a fixed end 5 connected rigidly to the frame 18. Parallel to the mounting frame 18 there is in FIG. 1 an outer member 14 of an articulation device which is connected by an articulation joint 13 with the inner member which runs parallel to the outer member 14. The inner member 10 of the articulation device has a guiding feature, such as an aperture, collar or sleeve, which runs along the guide rail 3 and as can be seen in the side views of FIGS. 3 and 4, it also has a similar guiding feature 12 on a second guide rail 4 running parallel to the guide rail 3. Thus, as the inner articulation member 10 slides back and forth on the guide rails 3 and 4, the outer member 14 of the articulation and the complete accessory 1 connected to the outer member 14 likewise run back and forth on the guide rails 3 and 4.

FIG. 1 also shows a mechanical drive 17 which consists essentially of an eccentric arm 19, a swinging eccentric drive member 22 and a manipulating lever 20. The front section of the swinging member 22 is mounted so as to pivot on the inner member 10 of the articulation device. The free rear end of the swinging member 22 is connected to rotate with the free end of the eccentric arm 19, whereas the other end of the eccentric arm 19 is mounted so as to rotate about a pin on the mounting frame 18. In the neighborhood of the bearing pin on which the eccentric 19 turns, an actuating lever, already mentioned, is provided which has openings in which, if needed, there can be fastened a rod for more easily actuating the lever 20 and the eccentric arm 19.

Figure 2:
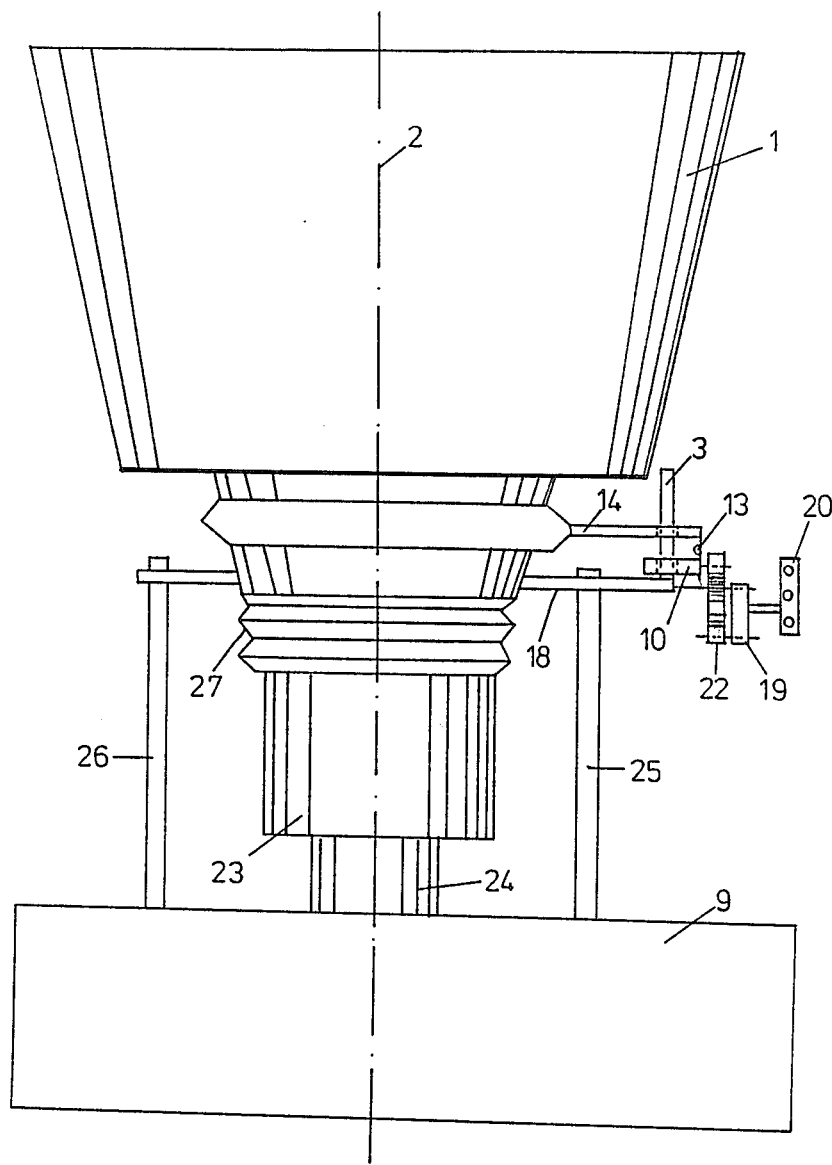
FIG. 2 is a top view like FIG. 1 with the anterior accessory in its working position on the lens.

FIG. 2 clearly shows the same arrangement as FIG. 1, except that the accessory 1 is in this case placed at the front end of the lens 23. Such placing of the accessory is produced by means of a mechanical drive by rotating the actuating lever 20 and the arm 19 by 180°. In contrast with FIG. 1, FIG. 2 shows the free end 7 of the guide rail 3 projecting through the positioning aperture 15 of the outer member 14 of the articulation device, so that in this case, the accessory 1 is fixed against swinging movements. The bellows 27 at the rear end of the accessory 1 surrounds the free front end of the lens 23. It can further be seen from FIG. 2 that the eccentric 19 is turned by 180° to the rear and likewise the actuating lever 20 connected to it, as compared with FIG. 1. The rotation of the lever 20 by 180° to the rear produces a corresponding rotation of the eccentric 19 on which the lever is fixed and which is mounted to rotate on the free end of the swinging member 22. In that way, the articulation device 10, 13, 14 connected with the swinging member 22 and the accessory 1 fastened thereto are rearwardly displaced towards the front of the lens 23.

Figure 3:
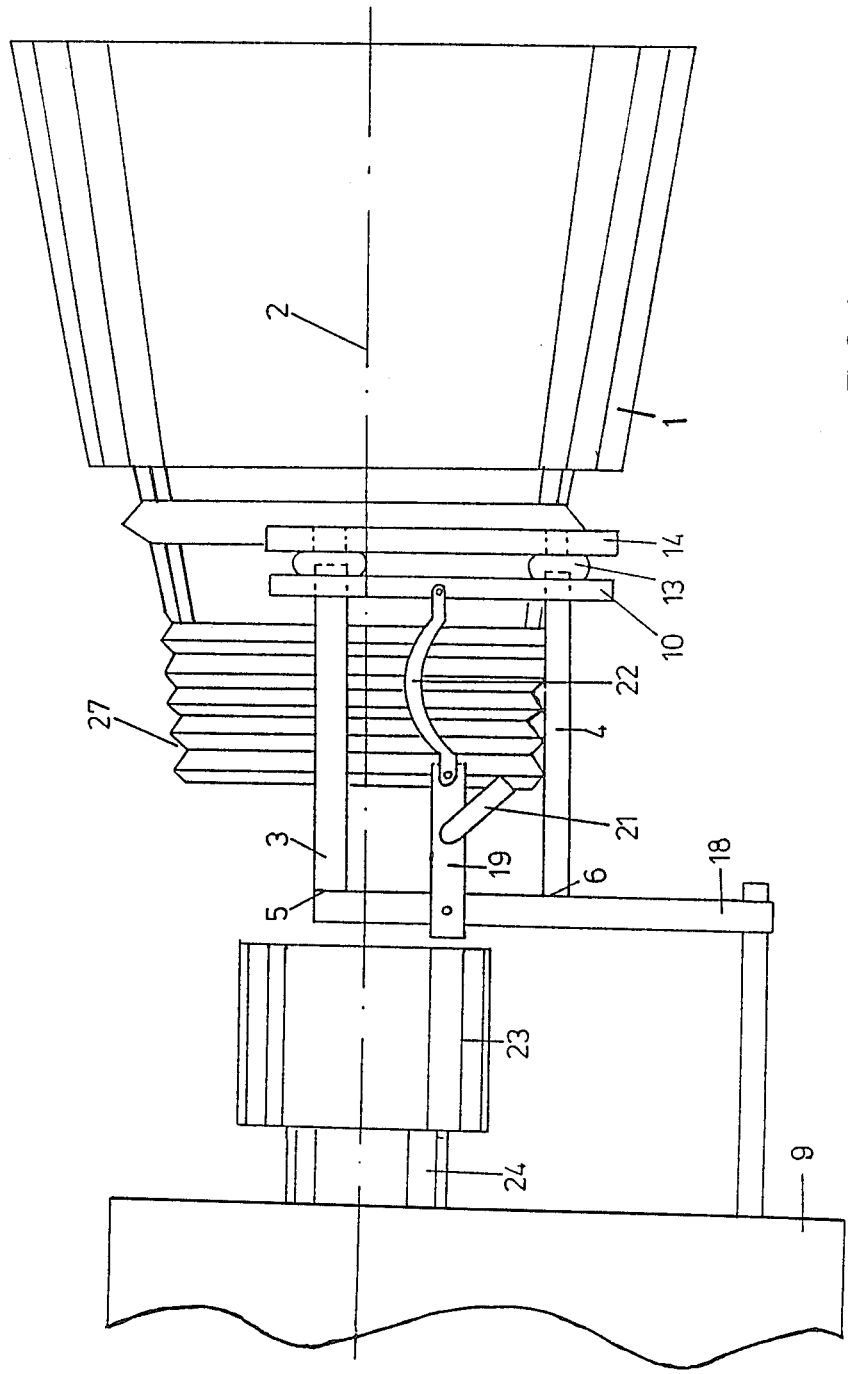
FIG. 3 is a side view corresponding to the top view shown in FIG. 1.

FIG. 3 shows a side view of the accessory holder of the invention in its position shown in top view in FIG. 1, i.e., with the accessory 1 shifted forwards. It is particularly evident from FIG. 3 that there are two guide rails 3 and 4 which are parallel to each other and parallel to the optic axis 2 of the lens and that their respective rear ends are fixed in place on the mounting frame 18 which is mounted from below and from the rear and is itself connected with a rod 25 (and a rod 26 as shown in FIG. 1), preferably in a swingable but also fixable manner, the rods 25 and 26 being connected to the lens support structure 9.

The shift lever 21 is in this case (FIG. 3), unlike the shift lever of 20 of FIGS. 1 and 2, shown in an oblique position extending downward and forward although it preferably lies in the same plane as the eccentric arm 19. It is so shown for reasons of making it more readily seen. For simplifying handling and manipulation, and to some extent for increasing the available torque, the middle section of the swinging member 22 is arched or bowed, preferably upwards. The articulation structure with its inner member 10, outer member 14 and the articulation joint 13 inbetween, is also visible in FIG. 3. The inner member 10 has guideways 11 and 12 respectively for the upper guide rail 3 and the lower guide rail 4. The outer member 14 has positioning (locking) holes 15 and 16 which are located and directed to receive the free ends 7 and 8 of the guide rails 3 and 4.

FIG. 4 is a side view of the subject matter shown in top view in FIG. 2, namely the accessory 1 in place, in its holder, on the lens 23. In contrast with FIG. 3, it is here noticeable that the accessory 1 is displaced rearwardly, to the left in the drawing, so that the free ends 7 and 8 of the respective guide rails 3 and 4 pass through the positioning or locking apertures 15 and 16 FIG. 4 furthermore shows an altered position of the eccentric 19 and of the actuating lever 21, rotated by 180° counterclockwise compared to FIG. 3. It can be seen that in FIG. 3 the eccentric arm effectively adds its length to that of the swinging link member 22, and in FIG. 4 subtracts its length therefrom in determining the spacing of the member 13 from the frame 18.

Although the invention has been described with reference to a particular illustrative embodiment, it will be understood that variations and modifications are possible within the inventive concept. For example, a single guide rail of suitable profile, perhaps of cross-shaped cross-section, might be used instead of the two guide rails 3 and 4, or, on the other hand, three or four guide rails could be used instead of two, in each case modifying the aperture pattern in the outer articulation member 14 and, if necessary, the shape and dimensions of the latter to fit the new guide rail pattern.

I claim:
1. Accessory holder for holding accessories in front of an objective lens of an optical system, said lens having an optic axis and being mounted on a supporting structure located rearwardly thereof, comprising:
   at least one guide rail (3, 4) disposed parallel to said optic axis (2) of said lens (23), said at least one guide rail having one end (5, 6) fixed in place on said supporting structure (9) of said lens and having another end (7, 8) which is a free end;
   articulation structure comprising inner (10) and outer (14) members held together by an articulation joint (13) having an axis, for permitting swinging of said outer member (14) relative to said inner member (10) about said joint axis, said inner member (10) being mounted for movement along said at least one guide rail in a manner maintaining said articulation axis perpendicular to said at least one guide rail and said outer member (14) having a locked position relative to said inner member wherein at least one aperture of said outer member are penetrated by said at least one guide rail thereby locking said outer member (14) in an orientation perpendicular to said optic axis, and;
   means for mounting, on said outer member (14) of said articulation structure, at least one accessory for said lens having an optic axis so that in said locked position of said outer member (14) said optic axis of said accessory substantially coincides with said optic axis of said lens, and
   said inner member (10) of said articulation structure being displaceable along said at least one guide rail from a first position in which said accessory is in a working position at the front end of said lens to a second position in which said inner member (10) is located on said at least one guide rail near its said free end while said outer member (14) of said articulation structure is beyond said free end of said at least one guide rail, and back from said second position to said first position,
   said outer member being provided with at least one said aperture corresponding to the location of said at least one guide rail for locking said outer member against swinging about said articulation axis when said articulation structure occupies its said first position and during its approach to and travel away from its said first position.

2. Accessory holder for holding accessories in front of an objective lens of an optical system, said lens having an optic axis and being mounted on a supporting structure located rearwardly thereof, comprising:
   a plurality of guide rails (3, 4) disposed parallel to said optic axis (2) of said lens (23), said guide rails each having one end (5, 6) fixed in place on said supporting structure (9) and each having another end (7, 8) which is a free end;
   an articulation structure comprising inner (10) and outer (14) members held together by an articulation joint (13) having an axis, for permitting swinging of said outer member (14) relative to said inner member (10) about said joint axis, said inner member (10) being mounted for movement along said guide rails (3, 4) in a manner maintaining said articulation axis perpendicular to said guide rails (3, 4) and said outer member (14) having a locked position relative to said inner member wherein apertures of said outer member (14) are respectively penetrated by said guide rails, thereby locking said outer member (14), in an orientation perpendicular to said optic axis; and
   means for mounting, on said outer member (14) of said articulation structure, at least one accessory for said lens having an optic axis so that in said locked position of said outer member (14) said optic axis of said accessory substantially coincides with said optic axis of said lens,
   said inner member (10) of said articulation structure being displaceable along said guide rails (3, 4) from a first position in which said accessory mounted on said outer member is in a working position at the front end of said lens (23) to a second position in which said inner member (10) is located on said guide rails (3, 4) near their respective free ends (7, 8) while said outer member (14) of said articulation structure is beyond said free ends (7, 8) of said guide rails,
   said apertures (15, 16) of said outer member (14) having a size and shape corresponding to the respective sizes and shapes of the cross-sections of said respective guide rails and a disposition corresponding to the disposition of said guide rails with respect to each other, for locking said outer member against swinging about said articulation axis when said articulation structure occupies its said first position and during its approach to and travel away from its said first position.

3. The accessory holder of claim 2 including also a frame (18) mounted on said supporting structure (9) of said lens, on which said frame said fixed ends (5, 6) of said guide rails (3, 4) are fastened, and means (17) for facilitating and controlling the shifting of said inner member (10) of said articulation structure back and forth on said guide rails for displacing a said accessory mounted on said outer member (14) back and forth over a predetermined path length.

4. The accessory holder of claim 3, wherein said means for facilitating and controlling displacement comprise:

an eccentric member (19) having a first pivot about which it is rotatable and an eccentric pivot spaced therefrom;

a link member (22) pivotally linked at one end to said eccentric member at said eccentric pivot thereof and having a pivot at its other end defining one working end of said means for facilitating and controlling the displacement of said inner member, the other working end thereof being said first pivot of said eccentric member, said two working ends of said means for facilitating and controlling displacement of said inner member being respectively fixed on said inner member (10) and on said frame (18), and an appendage (20, 21) extending from said eccentric member for manually applying force thereto and capable of rotating said eccentric member (19) at least 180° about its said first pivot.

5. The accessory holder of claim 4, wherein said first pivot of said eccentric member (19) is disposed for permitting said eccentric member to rotate about a fixed location on said frame (18) and said pivot of said link member at its end remote from said eccentric pivot of said eccentric member is located to permit to said link member (22) to swing about a fixed location on said inner member (10) of said articulation structure, the length of said guide rails and the dimensional ratios of the distances between the pivots of said eccentric member and between the pivots of said link member are such that 180° rotation of said eccentric member in one direction produces an accurate apposition of a said accessory mounted on said outer member (14) at the front of said lens (23) and a rotation by 180° of said eccentric member in the opposite direction provides a displacement of said accessory away from said lens for a predetermined distance to a location where said apertures (15, 16) of said outer member (14) of said articulation structure are cleared and said outer member (14) is thereby released for swinging about said articulation axis.

6. The accessory holder of claim 5, wherein the mid portion of said link member (22) is bowed so as to assure clearance between said link member and said first pivot of said eccentric member when said accessory is held close to said lens by said accessory holder.

7. The accessory holder of claim 5, wherein said outer member (14) of said articulation structure holds a sun shade, a filter, or both a sun shade and a filter.

* * * * *